(12) United States Patent
Hamburgen et al.

(10) Patent No.: US 7,183,902 B2
(45) Date of Patent: Feb. 27, 2007

(54) VERY LOCAL AREA NETWORK (VLAN)

(75) Inventors: William Hamburgen, Palo Alto, CA (US); Keith E. Moore, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 10/956,945

(22) Filed: Sep. 30, 2004

(65) Prior Publication Data

US 2006/0071761 A1 Apr. 6, 2006

(51) Int. Cl.
*G05B 11/01* (2006.01)

(52) U.S. Cl. .......................... 340/310.18; 340/310.16; 340/659; 340/693.1; 361/119; 709/249

(58) Field of Classification Search .......... 340/310.16, 340/664, 310.18, 659, 693.1; 361/111, 119, 361/56, 103, 118; 370/480; 709/249, 203; 439/654

See application file for complete search history.

(56) References Cited

U.S. PATENT DOCUMENTS 5,721,934 A * 2/1998 Scheurich ................... 713/320

| | | | |
|---|---|---|---|
| 6,771,164 B1 * | 8/2004 | Fink | 340/310.11 |
| 6,975,211 B2 * | 12/2005 | Atsuta et al. | 340/310.12 |
| 2002/0022991 A1 * | 2/2002 | Sharood et al. | 705/14 |
| 2002/0080010 A1 * | 6/2002 | Zhang | 340/310.06 |
| 2004/0024913 A1 * | 2/2004 | Ikeda et al. | 709/249 |
| 2004/0158661 A1 * | 8/2004 | Mokuya | 710/72 |

FOREIGN PATENT DOCUMENTS

WO   WO 02/05451      1/2002
WO   WO 02/005451   *  1/2002

* cited by examiner

Primary Examiner—Brent A. Swarthout

(57) ABSTRACT

A Very Local Area Network (VLAN) comprises a power strip device having an electrical connector for connection to an AC power supply line and one or more surge protectors and line filters. Multiple electrical power outlet sockets receive plugs from electrical appliances. A communications pathway interconnects the multiple electrical power outlet sockets to enable communication between appliances connected to the sockets. Electronics configure appliances as they are connected to the sockets to enable them to communicate over the communications pathway.

10 Claims, 1 Drawing Sheet

VERY LOCAL AREA NETWORK (VLAN)

FIELD

The present invention relates generally to powerline communications networks and, more particularly, to a Very Local Area Network (VLAN) and a method of operation thereof.

BACKGROUND

Ad-hoc powerline networking has been addressed by a number of prior solutions including PowerLine Modem USB plug-and-play, IP ARP/RARP protocols, BOOTP and IP DHCP. A particular disadvantage of the IP-based solutions is the complexity in configuring IP subnets and managing the hop-count for broadcast/multicasts. PowerLine Modem has the disadvantage in that proximity is governed by cable routing and not easily isolated to a collection of devices, for example in one room or an area, as opposed to devices in the same office or home.

At present when a powerline modem is used, the signal is propagated on the powerlines until a transformer is reached. This typically means that the signal is propagated throughout the household and potentially into neighboring apartments/offices, thus not providing a particularly secure communications network. Finally, the USB plug-and-play has similar features but devices connected to the USB system either require additional power cables or are limited in power consumption.

SUMMARY

A Very Local Area Network (VLAN) comprises a power strip device having an electrical connector for connection to an AC power supply line and one or more surge protectors and line filters. Multiple electrical power outlet sockets receive plugs from electrical appliances. A communications pathway interconnects the multiple electrical power outlet sockets to enable communication between appliances connected to the sockets. Electronics configure appliances as they are connected to the sockets to enable them to communicate over the communications pathway.

DETAILED DESCRIPTION OF EXEMPLARY EMBODIMENT

Figure 1:
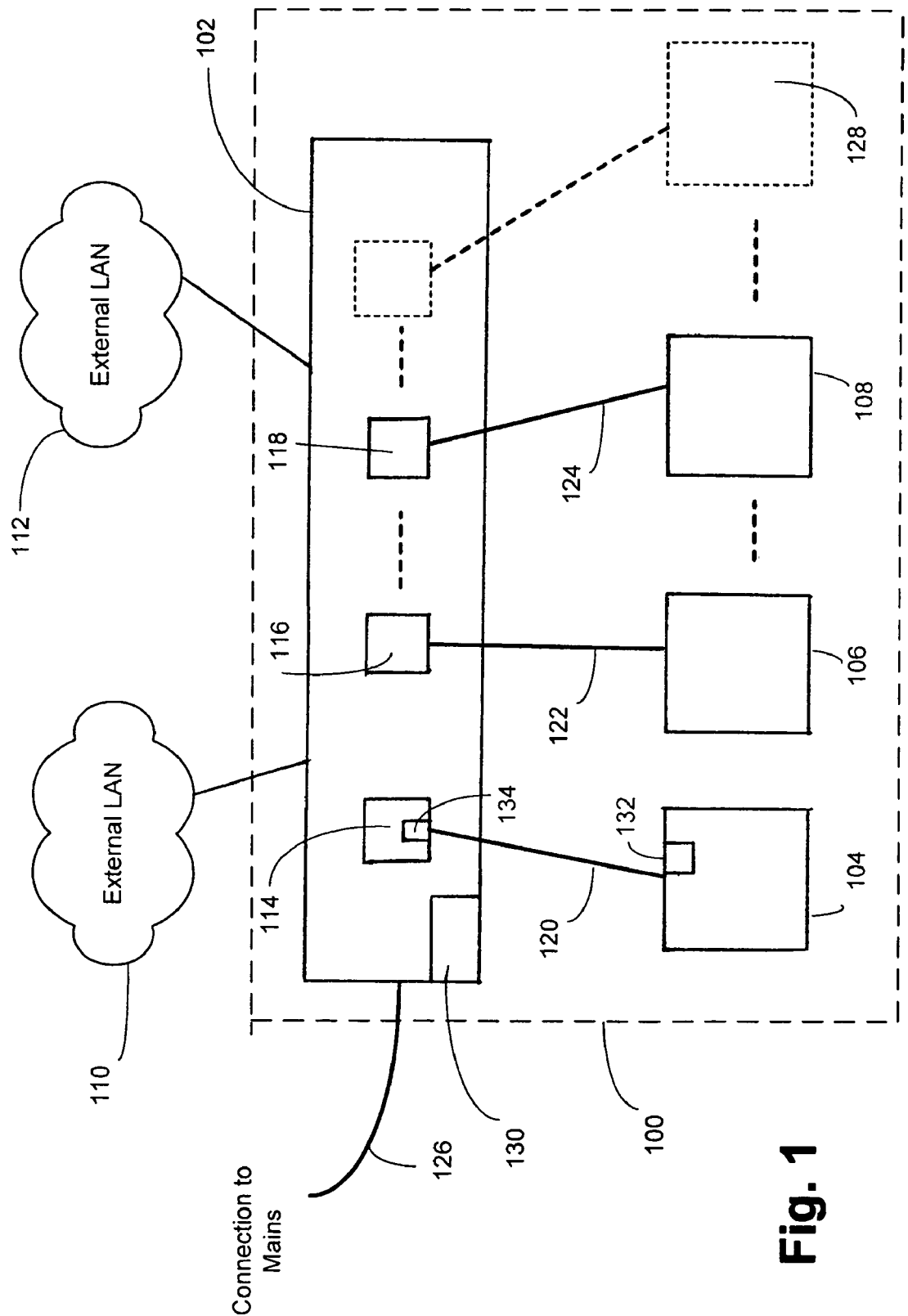
FIG. 1 is a schematic diagram showing a Very Local Area Network (VLAN) that uses power line communications in accordance with the an embodiment of the invention.

In FIG. 1 of the drawings, reference numeral 100 generally designates a Very Local Area Network (VLAN) in accordance with an embodiment of the invention. The VLAN 100 includes a power strip device 102 that interconnects a number of appliances 104, 106, 108 in a short range environment, such as in a room in an office or a home. Appliances can include computers, printers, home entertainment systems, etc. The VLAN 100 uses powerline networking technology, in particular using a powerline modem concept (described below), to provide secure communications among the appliances 104, 106 and 108 or as many as possible that can be connected to the power strip device 102.

The VLAN 100 is electrically isolated from powerline networked devices that are external to the VLAN 100 by the power strip device 102. The power strip device 102 also provides a bridge to other LANS such as 110 and 112 or, alternatively, to powerline networked devices. The power strip device 102 also, optionally, includes a memory 130 and offers additional functions limited only by the implementation details of the particular architecture.

The power strip device 102 has multiple AC outlets 114, 116, 118 and provides a hub for the AC-powered appliances 104, 106, 108. Each appliance 104, 106 and 108 has an AC cordset 120, 122 and 124, respectively, via which the appliance 104, 106, 108 is plugged into its associated AC outlet 114, 116, 118 of the power strip device 102. Thus, each of the appliances 104, 106, 108 is plugged into the shared power strip device 102, discovers other appliances connected to the power strip device 102 and passes data back and forth via the AC cordsets 120, 122, 124. The power strip device 102 is connected to the mains of, for example, a house or office through power cord 126.

Thus, all power and data transmission requirements of the devices 104, 106 and 108 are carried out through the power strip device 102. In order to transmit data back and forth, a power-line modem concept is implemented which generally uses Frequency-Shift Keying (FSK) with the device 102 employing an FSK modulator and an FSK demodulator. Inside the FSK modulator, data is transformed into two frequencies, one for a "zero" and another for a "one" derived generally from a crystal oscillator.

A feature of this VLAN architecture is that while surge protectors and line filters common in conventional power strip devices are problematical for systems requiring a wider area coverage, an advantage is achieved here whereby a high degree of isolation between multiple VLANs on the same set of building circuits is allowed. Furthermore susceptibility to external powerline networks and other AC mains-borne interference is reduced. Thus the VLAN 100 provides short range communications among a number of appliances with a sufficiently high degree of data transmission rates. Although the power strip device 102 in a default mode offers a high degree of isolation between the VLAN 100 and other powerline networked devices or LANs such as 110 and 112, the power strip device 102 can be controlled when it is necessary to communicate with the external devices or LANs 110 and 112.

A particular advantage of the VLAN architecture 100 is that, when a new appliance 128 is connected to the power strip device 102, the new appliance 128 is able to be alerted by the power strip device 102 to the default network configuration and/or policies of neighboring appliances 104, 106 or 108. Previously when a new appliance was brought into an environment such as a user's home or office, a significant amount of time was spent configuring the appliance for the specific network, security domain, proxy services, access rights and policies of the network of other devices in the home or office.

The VLAN 100 of the present system allows an easy and secure introduction of new appliances into a home gateway by plugging the appliance into the home gateway's shared outlet being the power strip device 102. Thus, a home-networking hub can have a power plug or use the power strip device 102 such that, when a new appliance is plugged in, the home-networking hub or power strip device 102 can inform the appliance on the networking parameters such as subnet mask, logging address, support service information and default address.

In the process of transferring or configuring new appliances, the power strip device 102 can be used as a boot strapping mechanism to transfer configuration information about the other networks in the home, security settings, credentials in a secure manner to two or more appliances that are connected to the power strip 102. The power strip device 102 sends a configuration signal to attached appliances that reply with their configuration information, where that appliance is configured. The power strip device 102 multicasts this information to the other appliances and, optionally, stores the configuration information in a data storage for replay or retrieval at a later time.

For example, configuration information can be transferred to a replacement appliance, such as a replacement printer. Furthermore, the present embodiment provides a mechanism to determine whether a appliance that has been configured is no longer reachable and allows the power strip device 102 to respond on behalf of the unreachable appliance. This is provided by a suitable protocol.

The VLAN architecture 100 is designed around an existing protocol such as HomePlug 1.0. This offers a standards-based starting point with access to commodity hardware and software as well as allowing communications with third party devices. However, very high bandwidths not anticipated by the HomePlug standard may be possible for an isolated system interconnected by short power cords.

It is possible that PowerHub hardware standards and communications protocols could incorporate a hierarchy of levels of capability incorporating existing standards such as HomePlug. In order of increasing bandwidth and locality, these levels might include:

1. Standards-based powerline LAN: under specific conditions, the power strip device 102 would allow controlled communications with devices external to the VLAN 100 at speeds limited by the protocol, for example up to 14 Mbps using up to 30 MHz carrier for HomePlug 1.0.
2. PowerHub VLAN: uses commodity detachable cordsets with all cords plugged into a single PowerHub isolated power strip. This environment offers the potential for higher data rates, lower costs and greater robustness. Peak bandwidth improvement over the standards-based powerline LAN may be limited by cordset radiation.
3. Extended PowerHub VLAN: cordsets and power strip device 102 are designed to operate together (controlled conductor spacing, additional shielding, etc.) to increase peak data rate while maintaining backward-compatibility with conventional power outlets and cordsets when so required.
4. Ultimate PowerHub VLAN: a new cordset designed with embedded dedicated data lines, that is copper or fiber, would allow very high data transfer rates. It could perhaps utilise existing non-powerline VLAN standards to communicate on the isolated data lines. Though attaining the highest data rates would require an "Ultimate PowerHub", the cordset should allow backward compatibility with older equipment or even function as a conventional dumb power cord when necessary.

Country-specific regulatory issues may hinder the development of the VLAN 100 and, in particular, the power strip device 102. For example in order to develop the "Ultimate PowerHub VLAN" it may be difficult to obtain approval to add copper data conductors or pins to an AC cordset without greatly increasing the cost and complexity. As an alternative, glass or even plastic optical fiber can be placed within the cordset. On the appliance end of the cord there is provision to install an inexpensive, high-quality optical interface, such as that shown at 132 in FIG. 1. At the plug end however this is more constrained although the fiber tip of the optical interface 134 could be placed either in the middle of one of the power plug pins, for example in the centre of the ground pin, or in a new dedicated location.

By guaranteeing only two such plug interfaces per link, high data rates may still be possible even though the couplings may individually have relatively poor optical performance. Given the short cord length, it may be possible to mold a plastic fiber with its interface optics as a single piece at a very reasonable cost.

Particular advantages of the VLAN 100 include a reduction in the number of wires for devices that require both power and data communication, such as finishing devices, scanners and collators. The VLAN 100 also allows an easy and secure introduction of devices to a home gateway by plugging into the home gateway's shared outlet. Further, the VLAN 100 provides a relatively easy mechanism to control exposure of appliances, that is if they are not on the same power strip device 102 then those appliances are not accessible. Finally, the VLAN 100 controls and manages the exposure of powerline modem networked devices by confining the transmission of signals to the particular VLAN 100.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A Very Local Area Network (VLAN) comprising two or more power strip devices wherein each of the two or more power strip devices comprises:
   an electrical connector for connection to an AC power supply line;
   one or more surge protectors and line filters;
   multiple electrical power outlet sockets to receive plugs from electrical appliances;
   a communications pathway interconnecting the multiple electrical power outlet sockets to enable communication between appliances connected to the sockets; and
   electronics to configure appliances as the appliances are connected to the sockets to enable the appliances to communicate over the communications pathway and to enable the appliance to communicate over the AC power supply line with an appliance connected to another power strip device.

2. A network as claimed in claim 1 wherein the electronics of the power strip device enables transfer of configuration information from one appliance connected to a power socket to another.

3. A network as claimed in claim 2 wherein each of the two power strip devices has a memory for storing the configuration information for subsequent retrieval and transmission to another appliance.

4. A network as claimed in claim 1 wherein each of the two power strip devices further comprises an optical interface for communication with appliances connected to the sockets.

5. A method of operating a Very Local Area Network (VLAN) comprising two or more power strip devices wherein each of the two or more power strip devices comprises an electrical connector for connection to an AC power supply line, one or more surge protectors and line filters, multiple electrical power outlet sockets to receive plugs from electrical appliances, and a communications pathway interconnecting the multiple electrical power outlet sockets; the method comprising:
- configuring appliances as they are plugged in to the electrical outlet sockets;
- enabling communication between configured appliances over the communications pathway; and
- enabling communication between an appliance connected to one of the two or more power strip devices and another appliance connected to another of the two or more power strip devices.

6. A method as claimed in claim 5 further comprising:
transferring configuration information from an appliance connected to a power socket to another appliance.

7. A method as claimed in claim 6 further comprising:
sending a configuration signal to an appliance connected to a power socket and receiving back configuration information.

8. A method as claimed in claim 7 further comprising:
multicasting configuration information to any other appliances connected to power sockets.

9. A method as claimed in claim 7 further comprising:
storing the configuration information for subsequent retrieval and transmission to another appliance.

10. A method as claimed in claim 5 further comprising:
informing any new appliance connected to a power socket about any one or more of the following parameters: default network configuration, neighboring appliances, subnet mask, logging address, default address and support service information.

* * * * *